United States Patent [19]

Chen

[11] Patent Number: 5,394,410
[45] Date of Patent: Feb. 28, 1995

[54] DIFFERENTIALLY CODED AND GUARD PULSE POSITION MODULATION FOR COMMUNICATION NETWORKS

[75] Inventor: Kwang-Cheng Chen, Menlo Park, Calif.

[73] Assignee: International Business Machines Corporation, Armonk, N.Y.

[21] Appl. No.: 968,726

[22] Filed: Oct. 30, 1992

[51] Int. Cl.[6] .............................................. G06F 11/08
[52] U.S. Cl. ..................................... 371/70; 371/47.1
[58] Field of Search .......................... 371/70, 47.1, 42; 375/114, 116; 360/40

[56] References Cited

U.S. PATENT DOCUMENTS

| | | | |
|---|---|---|---|
| 4,375,101 | 2/1983 | Cerracchio | 371/69 |
| 4,464,714 | 8/1984 | Huijser et al. | 364/200 |
| 4,518,947 | 5/1985 | Poston et al. | 340/347 |
| 4,599,723 | 7/1986 | Eck | 371/47 |
| 4,860,286 | 8/1989 | Forsberg et al. | 371/70 |

OTHER PUBLICATIONS

J. J. O'Reilly et al., "Line Code Design for Digital Pulse-Position Modulation" IEE Proceedings vol. 132, Pt.F, No. 6, Oct. 1985 pp.441–446.
T. Ohtsuki et al., "Parallel Rate–Variable Punctured Convolutional Coded PPM in Photon Communication" Transactions on Fundamentals of Electronics, Communications and Computer Sciences, E75, Tokyo, Japan Jan. 1992 pp. 1–51.
R. A. Cryan et al. "Heterodyne n-ARY PPM Employing Reed-Soloman Codes" IEEE Global Tele Conf., San Diego, US, May. 12, 1990 pp. 789–793.
H. Sugiyama et al., "MPPM: A Method for Improving the Band-Utilization Efficiency in Optical PPM", Journal of Lightwave Technology, vol. 7, No. 3., Mar. 1989 pp. 465–472.
EPO Search Report for YO991-118 dated Jan. 26, 1994.

*Primary Examiner*—Vincent P. Canney
*Attorney, Agent, or Firm*—Jack M. Arnold; Ronald L. Drumheller

[57] ABSTRACT

In a wireless infrared communications system, a technique for encoding data for serial transmission and the correlative technique for decoding the transmitted data. A data transmission period is divided into a plurality of slots. In a given pair of slots, the first slot comprises a gray code sequence of bits and a check bit, and the second slot comprises the same gray code sequence of bits and the complement of the check bit in the first slot. The last slot in a transmission time period comprises a guard slot to separate transmission time periods. A decoder receives the encoded data, and for a given slot derives calculated data for the slot from the gray code sequence of bits and the check bit. The check bit for the given slot is compared with a calculated check bit of the previous slot to determine if a predetermined relationship exists. If the predetermined relationship exists, the received encoded data is selected as the output of the decoder, and if the predetermined relationship does not exist, the calculated data is selected as the output of the decoder. The calculated check bit is derived from the output of the decoder for a slot, and is compared with the check bit of the encoded data for the following slot.

22 Claims, 8 Drawing Sheets

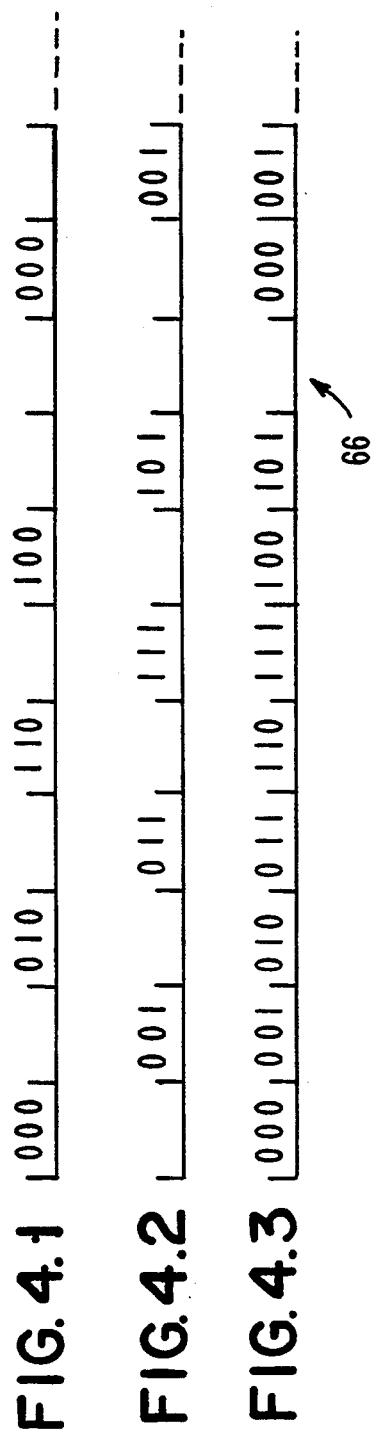
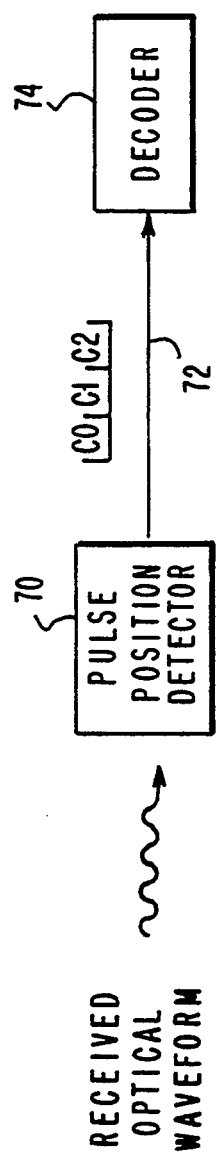
FIG. 4.1
FIG. 4.2
FIG. 4.3
FIG. 5

DIFFERENTIALLY CODED AND GUARD PULSE POSITION MODULATION FOR COMMUNICATION NETWORKS

FIELD OF THE INVENTION

The invention is in the field of encoding data for serial transmission and the correlative technique of decoding the transmitted data. Specifically, the invention is directed to wireless infrared communication channels where the data is encoded per symbol period as codewords comprises of gray-code constrained sequences of pairs of duplicated subcodes and complemented check bits in adjacent time slots of the symbol period. A guard slot is added as the last time slot of a symbol period.

BACKGROUND OF THE INVENTION

High data rate, power efficient, indoor infrared wireless communication links are difficult to reliably economically establish due to multi-path effects. Wireless networks operated in indoor mobile environments can provide much more flexibility in (computer) communication networking, office automation, and integrated service digital networks. Infrared transmission for this application has the advantage of being able to accommodate large information capacity. However, high rate (20–20M bps and up) communication links are difficult to reliably establish for indoor wireless infrared channels due to the following considerations:

Power-limited communication channels.
Requirements for power efficiency for a portable unit/transceiver.
Strong multi-path effects for high rate systems.
Simple, economical and practical receiver structure. Consequently, a bandwidth-limited communication environment.

There are four main issues in designing communication systems for the physical layer of this kind of communication network.
Modulation
Coding
Equalization
Synchronization There are a number of patents directed to the design of communications systems, each having certain advantages and disadvantages. A number of such patents are set forth below.

U.S. Pat. No. 4,599,723 to Eck discloses a technique for redundantly encoding data for synchronous or asynchronous serial transmission or recording and the correlative technique for decoding the serial bit stream are disclosed. The encoding technique involves making the second data string of a data strong pair the complement of the first data string and formatting to the format $H_1DataH_2Data$ where $H_1$ and $H_2$ are headers wherein at least one bit is the same in corresponding bit positions of the headers. Decoding involves first detecting the headers and then checking to confirm that the data fields are complements. Also disclosed is a technique for extracting bits from the data stream.

U.S. Pat. No. 4,375,101 to Cerrocchio discloses a system for formatting data on video tape for high accuracy recovery in which binary data is recorded on the video signal track of video tape in a prearranged format of three redundant blocks of data words between successive vertical sync pulses. Each redundant block of data words is preceded by a set of at least three redundant sync words and the last block of data words is followed by a fourth set of redundant sync words. The redundant sync words in each set are separated from each other by a plurality of blank horizontal sync pulses intervals. Circuitry for recovering data in this format is disclosed together with a system for writing data in this format.

U.S. Pat. No. 4,518,947 to Poston et al discloses a method and apparatus for decoding a redundantly coded digital signal wherein each information character is coded with a plurality of signal elements. Each of the signal elements is sampled by an analog to digital converter and the resulting sample value is transmitted to an adder. The sampled value is added to an accumulated sum which is received from a storage circuit. The sum of the sampled value and the accumulated sum is transmitted through a selector switch to both a decision circuit and the storage circuit. After the last of the redundant coded signal elements is sampled and the sampled values included within the accumulation sum, the state of the information character is determined by the decision circuit. The switch then enters a null data set to reset the accumulated sum to zero for processing the next group of redundantly coded signal elements.

U.S. Pat. No. 4,464,714 to Huijses et al discloses a system for transmitting digital information comprising a coding arrangement, a transmitting medium such as a record carrier, and a decoding arrangement. In such a system, the digital information is received in groups of input words which are converted, in the coding arrangements, into code words representing the input words. Each code word corresponds to an input word, and is arranged for application to the transmission medium, the code words being applied to the decoding arrangement via the transmission medium and then converted back into digital information in the decoding arrangement.

According to the present invention, data is encoded per symbol period as code-words comprised of gray-code constrained sequences of pairs of duplication subcodes and complementary check bits in adjacent time slots of the symbol period. A guard slot is added as the last time slot in each symbol period.

DISCLOSURE OF THE INVENTION

In a wireless infrared communications system, a technique for encoding data for serial transmission and the correlative technique for decoding the transmitted data. A data transmission period is divided into a plurality of slots. In a given pair of slots, the first slot comprises a gray code sequence and a check bit, and the second slot comprises the same gray code sequence and the complement of the check bit in the first slot. The last slot in a transmission time period comprises a guard slot to separate transmission time periods. A decoder receives the encoded data, and for a given slot derives calculated data for the slot from the gray code sequence of bits and the check bit. The check bit of the given slot is compared with a calculated check bit of the previous slot to determine if a predetermined relationship exits. If the predetermined relationship exits, the received encoded data is selected as the output of the decoder, and if the predetermined relationship does not exist, the calculated data is selected as the output of the decoder. The calculated check bit is derived from the output of the decoder for a slot, and is compared with the check bit of the encoded data for the following slot.

BRIEF DESCRIPTION OF THE DRAWINGS

FIGS. 4.1, 4.2 and 4.3 are detailed diagrams of binary states in the block diagram of FIG. 3;

FIG. 5 is a block diagram of a wireless infrared communications system decoder.

BEST MODE OF CARRYING OUT THE INVENTION

Figure 1:
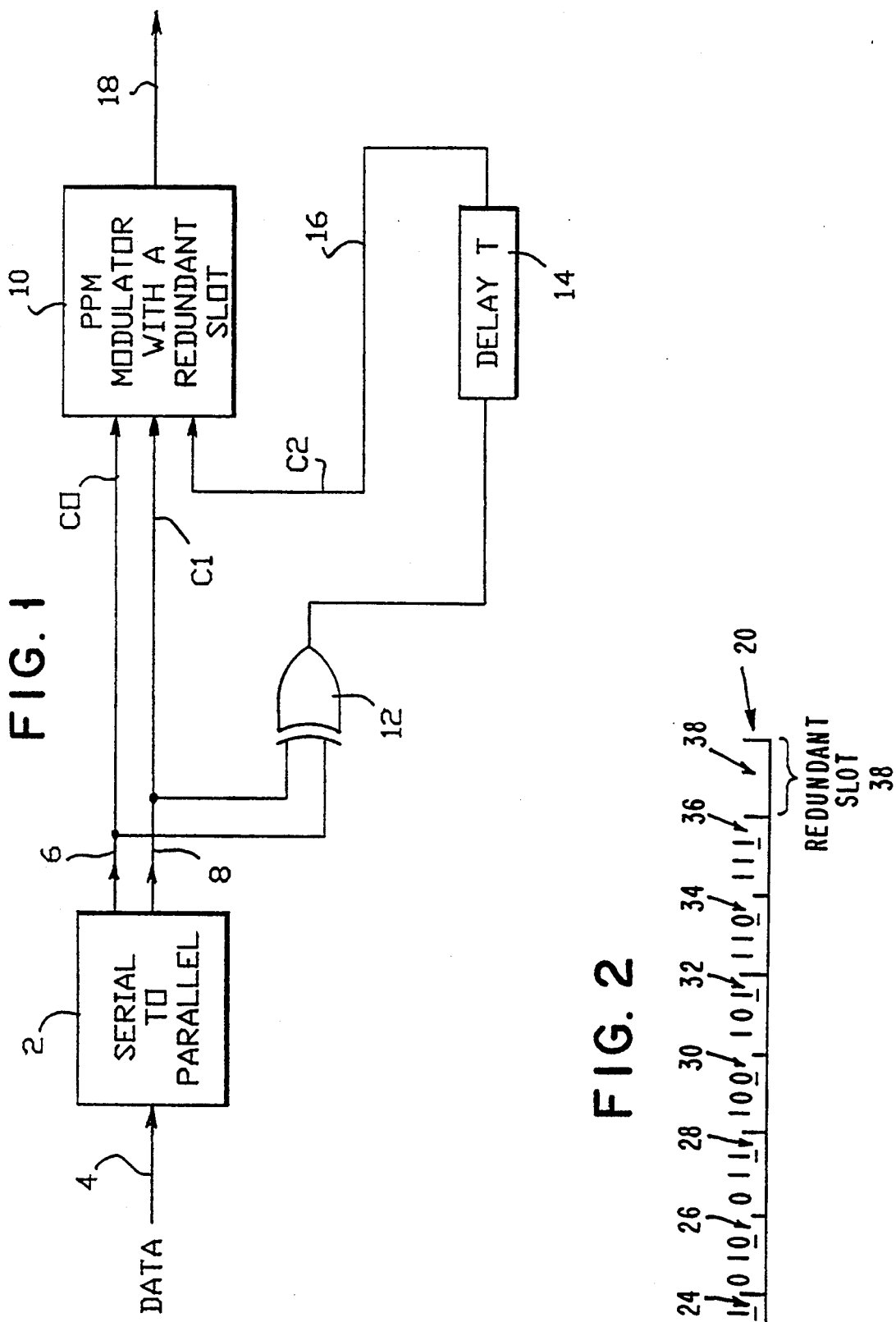
FIG. 1 is a block diagram of a wireless infrared communication system encoder.

A new coded modulation (combined coding and modulation), DCGPPM (Differentially Coded and Guarded Pulse Position Modulation), is set forth for a data communications system such as an indoor wireless infrared channel. DCGPPM can tolerated multi-path effects and a inaccurate timing so that equalization is no longer required and fine timing recovery circuits are not necessary, while conventional PPM receivers usually require fine timing. Consequently, DCGPPM can alleviate the requirements of an equalizer and synchronizer, and result in simpler overall receiver design. Reliable transmission of data with a rate of 40M bps and higher rate become practically realizable by this technique.

Within many networks, an unsuccessful transmitted message has to be retransmitted once there is an error. At the same time, networks are supposed to operate at low bot error rate. For indoor wireless IR networks, once the power level of optical pulses is enough to support reliable transmissions, the primary difficulties are channel distortions (especially multi-path effects) and fast timing recovery for high data rate systems. The above results in an observation that it is reasonable to assume that a previous symbol is correctly decoded when the decoding scheme is trying to decode the current symbol.

Another observation is that the primary error pattern results from the leakage power due to multi-path. As a matter of fact, this kind of error, power leakage to the next bit period or time slot, dominates the bit error rate. Inaccurate timing will also result in power leakage. The straightforward approach is either to build an accurate synchronizer and equalizer or to implement a powerful error correcting encoder/decoder. The use of such complicated circuits, which may make high rate systems impossible or impractical, does not look promising at this point. One motivation is that certain schemes which can tolerate multi-path fading and timing inaccuracy may be able to achieve an efficient system design.

Another motivation is to apply higher order PPM to improve the system performance of indoor wireless IR communications. For uncoded PPM, to double the number of times slots within one bit period is simply to double the noise bandwidth. The symbol error rate of 8-ary PPM is slightly higher than that of 4-ary PPM. However, for deeper fades, the error rate performance is similar for both cases with higher spectrum efficiency for 8-ary PPM. At the same time, to find a certain way to keep the noise bandwidth for both 8-ary and 4-ary PPMs, significant performance improvement is shown, especially for modestly deep fades. From state transition concept for trellis codes, a coding or a coded modulation scheme to utilize this advantage is developed.

Multi-path fading does not always cause troubles in system performance. Sometime, it can improve the system performance. In cases where the direct propagation path is blocked, one must utilize it (diffuse channel) to construct reliable communications links. Therefore, channel equalization may not be desirable in infrared wireless networking. Especially, for very power efficient system design(s), it is better to utilize the significant power brought by the multi-path effects.

The final consideration is timing recovery. Indoor wireless infrared channels are very time varying. The synchronizers at the receivers have to acquire the timing accurate enough to yield satisfactory error rate in a few bits for bursty transmissions. The synchronizers also have to tolerate the transitions from unblocked to blocked transmissions and vice versa. The network has to abort the whole transmission if there exists any error caused by any of the above situations. With a few bits for initial synchronization, errors caused by inaccurate timing recovery seem to be the primary error pattern if multi-path is further considered. To design a precise synchronizer to work at this high data rate and dynamic environment seems to require a complicated structure which is not practical in potential applications. A system design which is tolerant to inaccurate timing recovery and multi-path fading seems very promising. This is the basis for this invention.

The fundamental idea of DCPPM (Differentially Coded PPM) here is to introduce redundant states in order to trap the errors caused by multi-path effects. Since the errors are trapped, it is easy to recognize the correctly transmitted symbol. The way to introduce redundant states is by utilizing set partitioning. Under the assumption that a previously received symbol is correctly decoded, the current error, if it exists, is recognized by the information provided by the previous symbol. The redundant states actually carry this information.

The fundamental concept of GPPM is straightforward. The most dominated error pattern for orthogonal PPM results from the intersymbol interference caused by multi-path effects. The simplest method to alleviate this undesired situation is to add a redundant time slot at the end of each symbol period, that is, a guard band in the time domain. This redundant time slot does not carry any encoding information. This redundant time slot is assigned a code termed "don't care". Another important reason to use GPPM associated with the proposed coded modulation is to simplify the overall system complexity. This advantage will be seen later. At the same time, the application of GPPM can eliminate several error patterns to alleviate the symbol error rate in this situation.

Consequently, a general rule to construct a rate $R/\log(2^{R+1}+1)$ DCGPPM, which is described as follows.

With respect to encoding and modulation, suppose that an $(2M+1)$-ary (orthogonal) GPPM signaling is used. It consists of 2M-ary PPM and a redundant time slot. Without loss of generality, $M=2^{R+1}$, where R is a positive integer. A simple trellis encoder has the following property:

$$v_r^n = u_r^n \; r=1,\ldots,R$$

$$v_{R+1}{}^n = u_1{}^{n-1} \ominus \ldots \ominus u_R{}^{n-1} \quad (1)$$

where $V_r{}^n(u_r{}^n)$ denotes the rth bit of the output (input) of an encoder to produce the nth symbol.

$v_{r+1}{}^n$ is a redundant bit which is functioning like a check bit. Then, according to set partitioning principle, divide PPM formats into two sets $S_1$ and $S_0$ by the check bit. The resulting $2M+1$ time slots are arranged as $$S_1{}^0 S_1{}^1 \ldots S_M{}^0 S_M{}^1 x$$

where $S_m{}^0$ denotes the check bit to be "1" or the element belong to set $S_1$, $S_m{}^0$ denotes the check bit to be "0" or the element belong to set $S_0$ and x denotes a "don't care" which carries no information in the encoding stage and is only used for the purpose of decoding. Comparing with M-ary uncoded scheme, the same Euclidean distances are kept. Please notice that the distance of orthogonal PPM can not be increased without considering functional expansion in the time domain. The positions of pulses may best be arranged in the following way.

The elements in $S_0$, $S_1$ are Gray coded.

The elements in $S_1$ may be circularly rotated (either right or left) by 0, ... M−1 times. As a matter of fact, the number of rotation(s) should be decided by the following consideration: complexity of circuits/decoding algorithm, intersymbol interference caused by multi-path effects, and most importantly, to avoid increasing the noise bandwidth (that is, the last state of current bit can not be succeeded by the first state of next bit). The inaccuracy of initial timing recover can not be neglected. The trade-off will be discussed later. For the time being, the number of rotations is chosen to be 0, that is, no rotation at all. Thus, the last two informed time slots have the check sum "1". The goal of the last (redundant) time slot is two-fold; to resist potential intersymbol interference caused by the multi-path fading and to keep the decoding algorithm/circuits simple.

Decoding and Demodulation

Let $d_r{}^n$ denote the detected energy (photons) of the rth time slot for the nth symbol. The input (output) bit string of the decoder is denoted by $V_r{}^n(U_r{}^n)$. The decoding and demodulation of the DCGPPM follows the rule:

Form check $C^n = U_1{}^{n-1} \ominus \ldots \ominus U_r{}^{n-1}$.

In case $C^n = 0$, $d_1{}^n \ldots d_{2M}{}^n$ are used for the next step.

In case $C^n = 1$, $d_2{}^n \ldots d_{2M+1}{}^n$ are used for the next step.

Detect the position of pulse and decide its representation to be $(V_1{}^n, \ldots, V_{R-1}{}^n)$ If $C^n = V_r{}^n$ (r=1, ... R). The representation of $d_{2M+1}{}^n$ is exactly the same as that of $d_1{}^n$ due to the circular sense of decoding and the fact that only one of $d_1$ and $d_{2M+1}$ is taken into consideration.

If $C^n \neq V_{R+1}{}^n$, the position of pulse is decided to be incorrect. The true position should be $$\frac{1}{2M+1}$$

bit period backward in the circular sense. $U^n$ can therefore be decided.

$$u_1{}^n \ldots u_R{}^n \rightarrow \text{ENCODER} \rightarrow v_1{}^n \ldots$$
$$v_{R+1}{}^n \rightarrow \text{CHANNEL} \rightarrow V_1{}^n \ldots$$
$$V_{R+1}{}^n \rightarrow \text{DECODER} \rightarrow U_1{}^n \ldots U_R{}^n$$

Relation of Code Sequences

Denote T to be a one bit period. The separation of immediate neighboring pulses for uncoded PPM ranges from T/M to $(2M-1)$ T/M. The pulse separation for DCGPPM ranges from $3T(2M+1)$ to $(4M-1)T(2M+1)$. Therefore, the assumption that noise bandwidths for uncoded and coded PPMs are approximately the same is a conservative assumption.

An important feature of this decoding/demodulation scheme is that it is suitable for hardware realization by logic gates. It makes this design very realizable at high data rates in spite of its suboptimality for decoding. Of course, the optimal (in the sense of performance) decoding strategy is the maximum likelihood estimation such as a Viterbi algorithm or a sequential estimation. Although efficient decoding methods combining TCM and equalization have been investigated, it is still too complicated for high rate systems with today's technology. The proposed scheme has the advantage of resisting multi-path fading without channel equalization filtering.

Consider the application of a rate $\log_1 M / \log_2(2M+1)$ DCGPPM in indoor wireless infrared communication links. A 9-ary GPPM is used in this example. In addition to a redundant slot, two groups of codes are generated according to set partitioning:

$$S_0 = \{000, 010, 110, 100\}$$

$$S_1 = \{001, 011, 111, 101\}$$

The positions corresponding to different codes for 9-ary DCGPPM is as above if 1 rotation to right is taken. They are $$(000, 001, 010, 011, 100, 101, 110, 111, x)$$

Suppose $U_1{}^{n-1} U_2{}^{n-1} = 11$ after decoding/demodulation. Then, $C^n = 0$. Let the nth transmitted symbol be "01" which is encoded to be "010". Suppose there exists strong multi-path and noise so that the receiver receives it as "011". However, because the check bit is different from $C^n$, the pulse position is decoded one step backward as "010". This is the kind of error which is most likely to happen, and which can be corrected. This is described later as a Case 1 in a specific example with reference to FIG. 8.

Suppose $U_1{}^{n-1} U_2{}^{m-1} = 01$ after decoding demodulation. $C^n = 1$ assume the nth transmitted symbol to be "11". The receiver will look into time slots from "111" to "x" since $C^n = 1$. Again, because of error, the receiver decides "x" to be received and decoded to "000". The check bit is different from $C^n$. The actual pulse position is finally decoded one step backward in the circular sense as "111" which is another correctable example. This is described later as a Case 2 in a specific example with reference to FIG. 9.

State more simply, a DCGPPM array is defined as an array of $(2M+1)$ slots with a symbol period of T.

$M = 2^n$, where n equals the number of data bits per symbol.

If there are 2 data bits per symbol $$M = 2^2 = 4$$

Therefore, it follows that the number of slots in the array where there are 2 bits per symbol is:

$2(4)+1 = 9$ slots where the first eight slots are data slots and the last (ninth) slot is the guard slot. This corresponds to the 9-ary DCGPPM previously described, where there are two data bits plus a parity in each slot. The data bits in consecutive slots forming a pair ff slots are identical and the parity bits are complementary. For example, in slots 1 and 2, the data bits are, reading left to right, are each 00, and the parity bit in slot 1 is 0, and complementary parity bit in slot 2 is 1. The same convention is used for consecutive slots forming pairs of slots 3 and 4, 5 and 6, and 7 and 8. Guard slot 9 is left empty to demarcate symbol periods, where each symbol period is comprised of the 9 slots.

Refer to FIG. 1 which is a block diagram of an encoding and modulation mechanism according to the invention. Serial data which is to be encoded is provided to a serial to parallel converter 2 from an input line 4. The serial data provided to line 4 may be provided from a source of data (not shown), such as a computer, in the form of an image file, a frame of video or the like. Each symbol is represented as 2 bits of data as manifested on lines 6 and 8, which are provided to a Pulse Position Modulator (PPM) with a redundant guard slot. The 2 bits of data as manifested on lines 6 and 8 are referred to as C0 and C1 respectively. It is to be appreciated that a greater number of bits may be used as the data.

The bits C0 and C1 are provided as inputs to a parity check network comprised of an exclusive OR network 12, with the generated parity bit being delayed in a delay network 14 for a delay of T, where T is equal to the symbol period (2M+1). For a 9 slot array, the delay is equal to 9. This delayed parity bit, referred to as C2, is provided via line 16 to PPM modulator 10. The PPM modulator then combines C0, C1 and C2 for each slot, as described below, to provide a modulated signal on output line 18.

Figure 2:
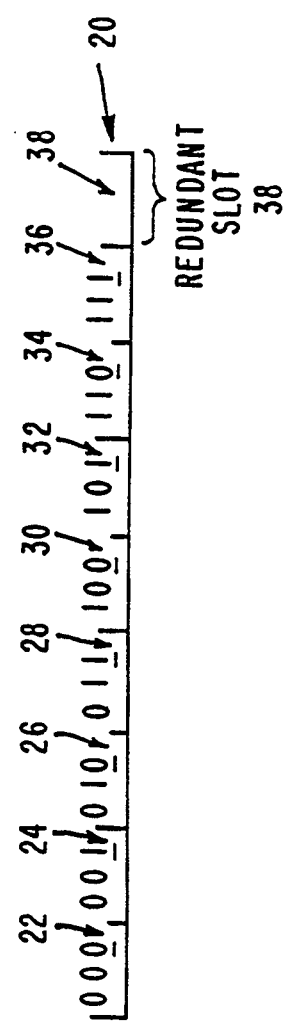
FIG. 2 is a diagram of data transmission format according to the invention.

The modulated signal on output line 18 is shown in FIG. 2 as signal 20 which is comprised of 9 slots, that is a symbol period of 9. In the first pair of slots, a first slot 22, comprised of bits C0, C1, C2 is equal to 000, reading left to right. The rightmost parity bit 0, was generated from C0 and C1 in the previous symbol period due to the delay network 14 (FIG. 1) as previously explained. In the second slot 24 of the pair of slots, is comprised of bits C0, C1, C2 is equal to 001, reading left to right. C0 and C1 in slot 24 are the same data bits as C0 and C1 of slot 22. The parity bit C2 of slot 24 is the complement of the parity bit C2 of slot 22. The same convention is used for consecutive pairs of slots 26 and 28, 30 and 32, and 34 and 36. Slot 38 is a redundant guard slot.

Figure 3:
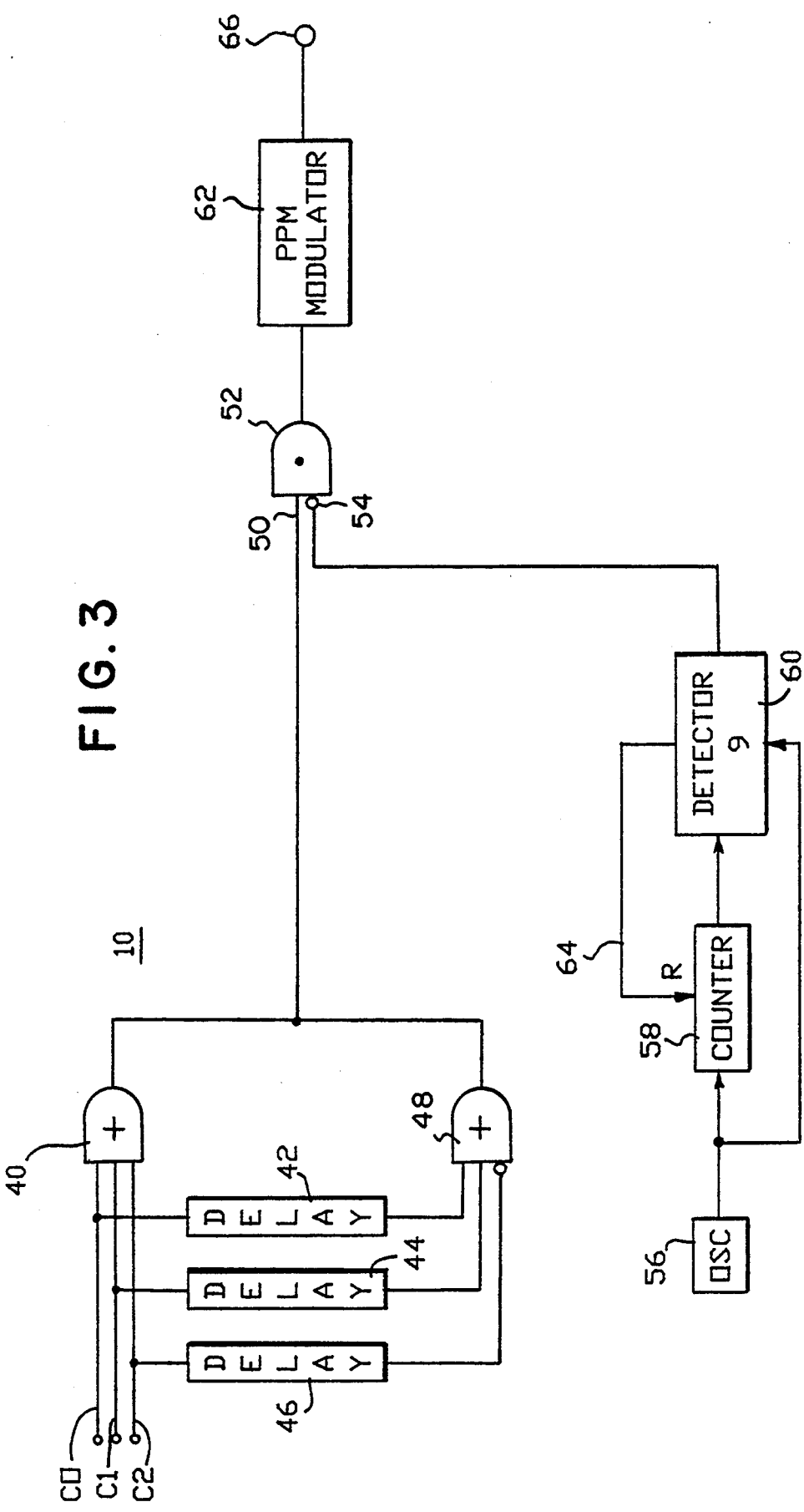
FIG. 3 is a block diagram illustrating how a data format is generated.

Refer now to FIG. 3 and FIGS. 4.1–4.3 which illustrate one way of generating the data format for the DCGPPM. FIG. 3 is a detailed block diagram of the PPM modulator with a redundant slot of FIG. 1, and FIGS. 4.1–4.3 illustrate wave forms present in the circuit of FIG. 3.

Each of the data bits C0 and C1, and the parity bit C2 for the odd slots are provided to respective inputs of an OR gate 40 and to delay networks 42, 44 and 46, respectively. This is illustrated in FIG. 4.1. It is seen that C0, C1 and C2 are provided for every other time slot interval. This is readily accomplished by a standard shift register and gating arrangement. The delay networks 42, 44 and 46 each have a delay equal to a slot interval, that is a delay of 3 bits in duration. These delayed signals, as shown in FIG. 4.2, are manifested at the respective inputs of OR gate 48. Note that the delayed parity bit C2 is inverted at the input of OR gate 48, to become the complement of the parity bit applied to OR gate 40. It is seen that the output of OR gate 40 are data bits and parity bits for odd slots, and the output of OR gate 48 are data bits and complementary parity bits for even slots. Each of these output signals are applied to a first input of an AND gate 52. This gate has an inverting input 54. The derivation of the signal applied to input 54 is set forth below.

An oscillator 56 provides output pulses at the same bit frequency as the data bits and parity bits C0, C1 and C2, respectively. The logic for generating C0, C1 and C2 would, of course, be synchronized with the oscillator 62. The output pulses from the oscillator 56 are provided to a counter 58 and a detector 60. The counter 60 counts these pulses, and the count is provided to the detector 60 which is designed to detect a count of 9, which is indicative of the occurrence of the ninth slot, i.e., the guard slot for a given symbol period T. For counts of 1 thorough 8, the output of detector 60 is LOW, which is inverted to a HIGH signal at the inverting input of AND gate 52. Accordingly, the date and parity bits in the slots 1 through 8 are provided at the input 50 are gated through to a standard PPM modulator 62. When detector 60 detects a count of 9, its output goes HIGH and is inverted to a LOW signal at inverting input 54, thus disabling AND gate 52 during slot 9. When a count of 9 is detected, a reset signal is applied to a reset terminal 64 of counter 64 to initialize the counter for the following symbol period.

The output signal manifested at the output of AND gate 52 is illustrated in FIG. 4.3. It is see that there are data and parity bits in each of the first eight slots, and that slot 9, as indicated 66, is absent information, thus functioning as a guard slot. The PPM modulator 62 modulates this signal in a known manner to provide a DCGPPM signal at an output terminal 66 for provision to a remote decoder. Although the block diagram of FIG. 3 is shown in one hardware form, it is to be appreciated it may also be implemented in other hardware forms, as well as utilizing software techniques.

Refer to FIG. 5 which illustrates a DCGPPM decoder. The output signal from the modulator 62 (FIG. 3), which signal may be a radio frequency signal or an optical signal is provided to a pulse position detector 70 of standard design and the data bits and parity bits C0, C1 and C2 for each slot of a symbol period are provided via line 72 to a decoder 74 for decoding as set forth below.

Figure 6:
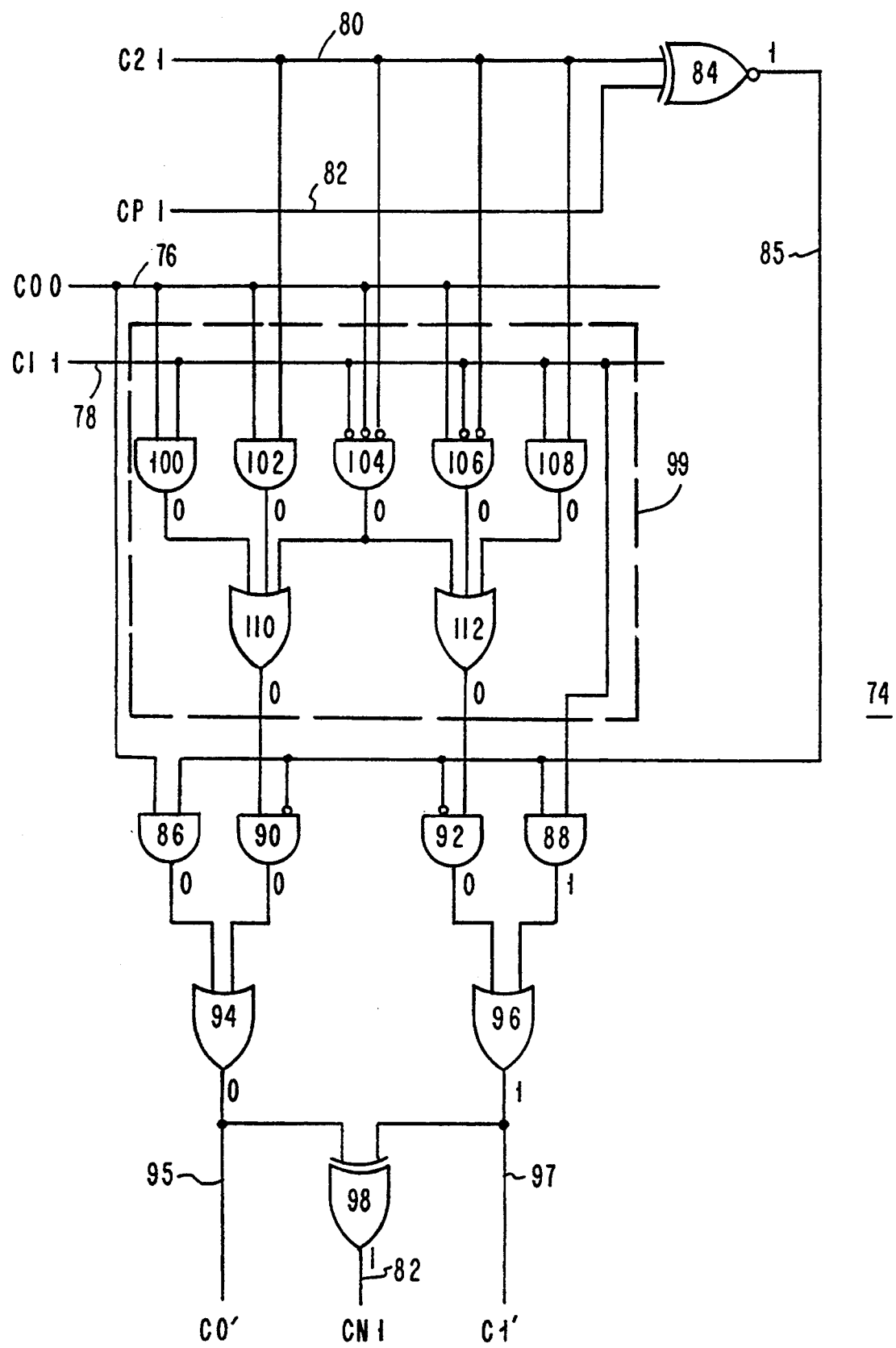
FIGS. 6-10 are identical detailed block diagrams of the decoder of FIG. 5, with each FIG. illustrating a different decoding sequence.

Refer to FIG. 6 which is a detailed block diagram of the decoder 74 of FIG. 5. It is to be appreciated that other hardware and/or software may be utilized for the decoder 74. Decoder 74 receives C0 and C1 for a current slot on lines 76 and 78 respectively. C2, the check bit for the current slot, is received on line 80 for comparison with a calculated check bit CP from a previous slot on line 82. CP is generated as CN at the output of XOR gate 98 during the previous time slot. The comparison is achieved in a comparator such as a XOR gate 84 with an inverting output. The non inverting output (not shown) of XOR gate 84 could also be utilized with suitable logic modifications. If the current check bit, C2 on line 80 and the calculated check bit CP for a previous slot on line 82 are the same binary value, C0 and C1 for the current slot are selected as the output C0' and C1' on lines 95 and 97, respectively, of decoder 74. On the other hand, if the check bit for the current slot C2 and the calculated check bit CP for the previous slot are different binary values, decoder 74 calculates C0 and C1 of the previous slot as the output C0' and C1' on lines 95 and 97, respectively, of decoder 74. That is, there is a rotation one slot backward in a circular sense. This is set forth in more detail below.

The inverting output of XOR gate 84 on line 85 is applied to select or enable inputs of AND gates 86, 88, 90 and 92. The select inputs of AND gates 90 and 92 are inverting inputs, so it is seen that when the inverting output of XOR gate is High, a 1, gates 86 and 88 are selected, and gates 90 and 92 are not selected. Conversely, when the inverting output of XOR gate is LOW, a 0, gates 86 and 88 are not selected, and gates 90 and 92 are selected.

The outputs of gates 86 and 90 are inputs to OR gate 94, and the outputs of gates 88 and 92 are inputs to OR gate 96. The output of OR gate 94 on line 95 is the decoded first data bit C0', and the output of OR gate 96 on line 97 is the decoded second data bit C1' of decoder 74. A comparator such as XOR gate 98 compares the decoded C0' and C1' to form a calculated check bit CN on line 82 which is compared (as CP) with the check bit C2 of the following slot as described above. That is, the output of XOR gate 98 is connected to the input of XOR gate 84 via line 82. If C0' and C1' on lines 95 and 97, respectively, are the same binary value, the non inverting output of XOR gate is High, a 1. Conversely, if C0' and C1' are different binary values, the output of XOR gate 98 is LOW, a 0. The inverting output (not shown) of XOR gate 98 could also be used.

The second inputs to AND gates 86 and 88 are C0 and C1, respectively. Therefore, it is seen that when the output of XOR gate 84 is a 1, that is C2, the check bit for the current slot on line 82 is the same binary value as the calculated check bit CP for the previous slot, C0 and C1 are provided at the outputs of OR gates 94 and 96, respectively, as the decoded outputs C0' and C1', respectively.

The second inputs to AND gates 90 and 92 are from a gating network 99 which calculates C0 and C1 from a previous slot. Gating network 99 is comprised of AND gates 100, 102, 104, 106 and 108, and OR gates 110 and 112. C0 on line 76 is connected to inputs of gates 100, 102, and inverting inputs of gates 104 and 106. C1 on line 78 is connected to inputs of gates 100 and 108, and inverting inputs of gates 104 and 106. C2 on line 80 is connected to inputs of gates 102 and 108, and inverting inputs of gates 104 and 106. The outputs of gates 100, 102, 104 are connected to inputs of OR gate 110. The outputs of gates 104, 106 and 108 are connected to inputs of OR gate 112. The outputs of OR gates 110 and 112 are provided to the second inputs of AND gates 90 and 92, respectively. Therefore, it is seen that when the output of XOR gate 84 is a 0, that is C2, the check bit for the current slot on line 82 is a different binary value than the calculated check bit CP for the previous slot, the outputs of gates 110 and 112 from gating network 99 are selected for provision to the outputs of OR gates 94 and 96, respectively, as the decoded outputs C0' and C1', respectively, which in this instance are C0 and C1 from the previous slot. This is explained in detail below with respect to specific examples.

With respect to FIG. 6, consider a first case of a correcting decoding of a received C0, C1, C2. For example, 011 is transmitted and 011 is received, and the previous check $C^n = U_1^{n-1} = 11$, that is the previous check bit is 1. Therefore, the binary states are as shown. Since C2 and CP on lines 80 and 82, respectively, are each 1, the output of XOR gate 84 is a 1. Therefore, gates 86 and 88 are selected and C0 and C1 on lines 76 and 78, respectively, are provided at the outputs of gates 86 and 88, respectively, to OR gates 94 and 96, respectively. Therefore, the output C0' and C1' of decoder 74 on lines 95 and 97, respectively, are the received C0 and C1. The output of XOR gate 98 is 1, the calculated check bit CN.

Figure 7:
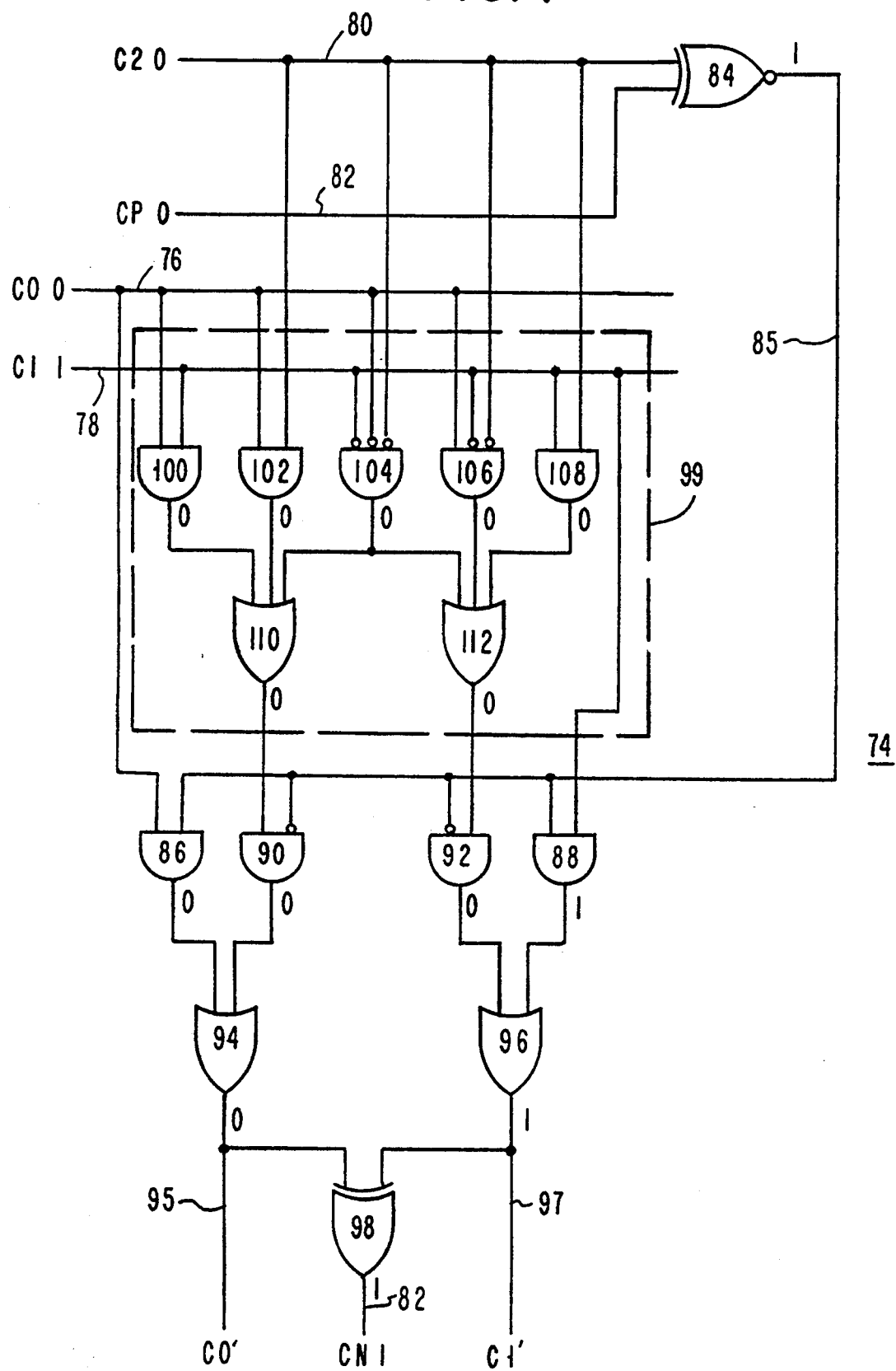

Refer now to FIG. 7 which illustrates a second case of a correct decoding of a received C0, C1, C2. For example, 010 is transmitted and 010 is received, and the calculated check bit CP for the previous slot is 0. Since C2 and CP on lines 80 and 82, respectively, are each 0, the output of OR gate 84 is a 1. Therefore, gates 86 and 88 are selected as in the previous example, and the output C0' and C1' of decoder 74 on lines 95 and 97, respectively, are the received C0 and C1. The output of XOR gate 98 is 1, the calculated check bit CN.

Figure 8:
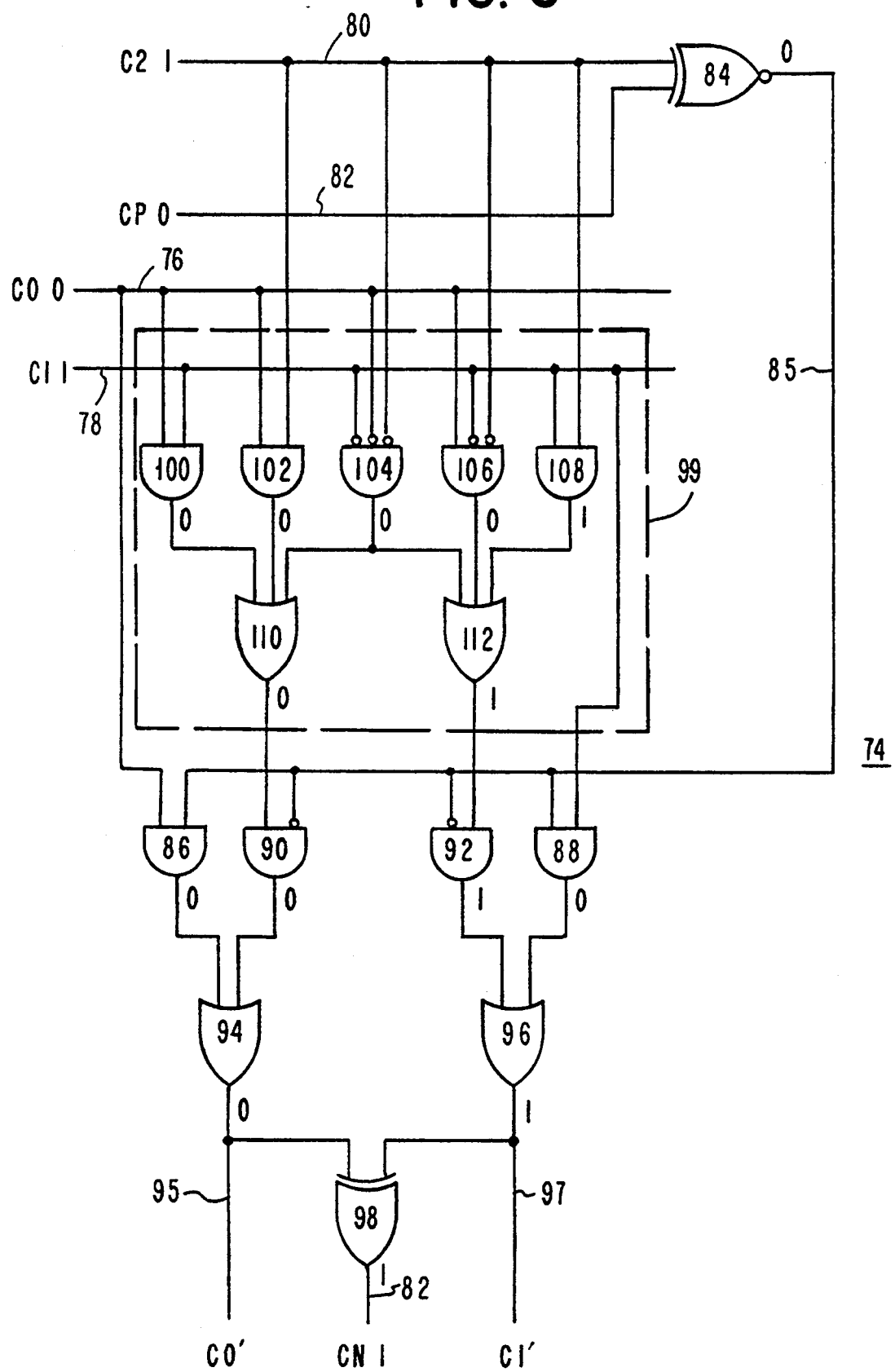

Refer now to FIG. 8 which illustrates a correct decoding when the transmitted check bit C2 for the current slot is incorrect. This is the previously described Case 1. For example, 010 is transmitted and 011 is received, i.e., the check bit C2 for the current slot on line 80 is incorrect. The calculated check bit CP for the previous slot is 0. Since C2 on line 80 is a 1 and CP on line 82 is a 0, different binary values, the output of XOR gate 84 is a 0 and gates 90 and 92 are selected. That is, the output of gating network 99 will be the decoded C0' and C1'. Each of AND gates 100, 102, and 104 has at least one input which is a 0, therefore the output of each of these gates is 0. Accordingly, the output of OR gate 110 is a 0, which is selected by AND gate 90 as the input to OR gate 94. Therefore, the output of gate 94 is a 0. That is, C0' is a 0, which is the same value as C0. Each of AND gates 104 and 106 has at least one input which is a 0, so the output of each of these gates is a 0. However, AND gate 108 has a first input at 1, C1 on line 78, and a second input at a 1, C2 on line 80. Accordingly, the output of AND gate 108 is a 1. Therefore, the output of OR gate 112 is a 1, which is selected by AND gate 92 as the input to OR gate 96. Therefore, the output of gate 96 is a 1. That is C1' is a 1, which is the same value as C1. Therefore, the correctly received data bits are correctly decoded, whereas the incorrectly received check bit C2, doesn't destroy the data. XOR gate 98 calculates the calculated check bit as a 1, since C0' and C1' have different binary values.

Figure 9:
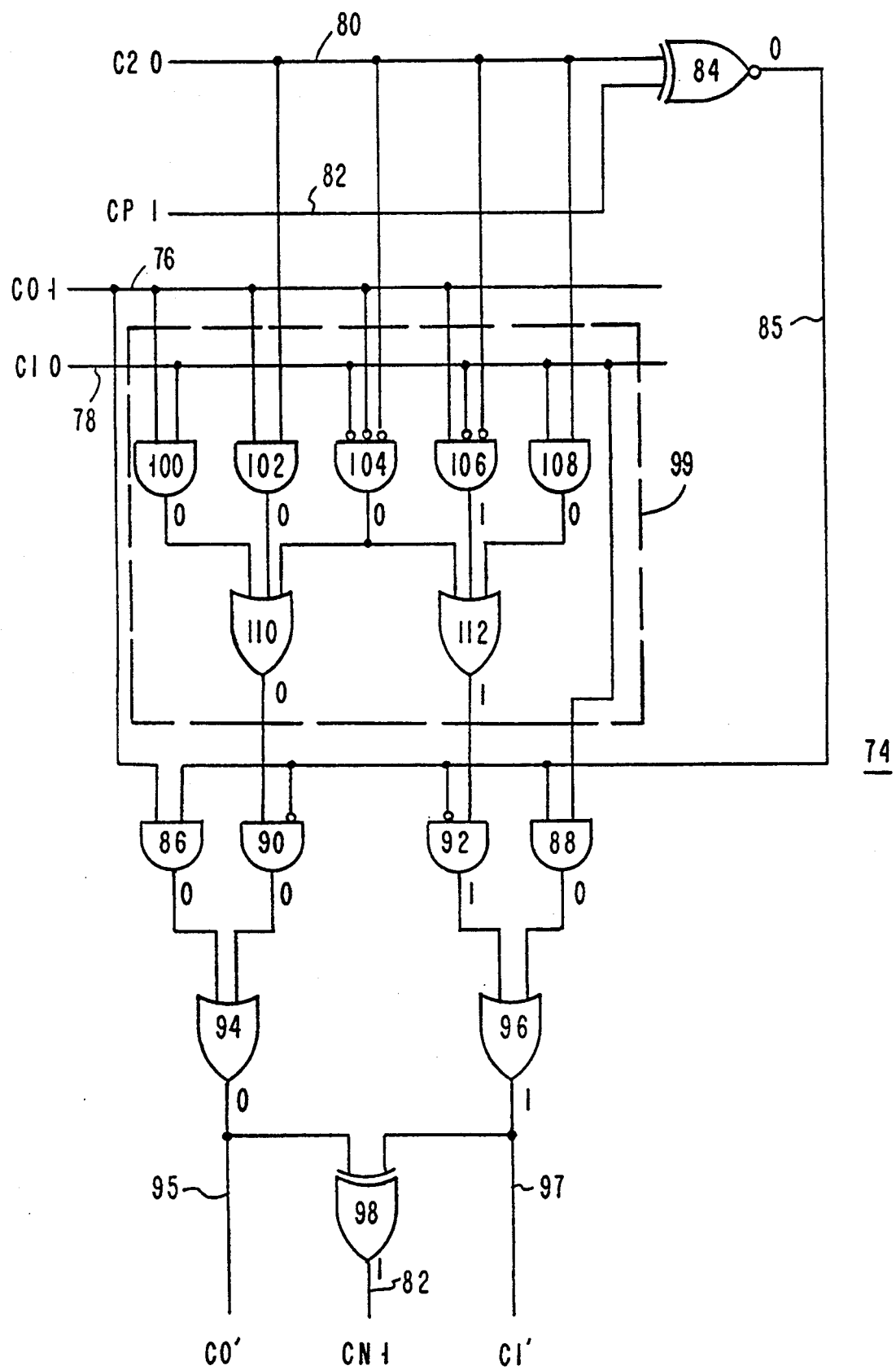

Refer now to FIG. 9 which illustrates a correct decoding by correcting an error in the received data bits and check bit. This is the previously described Case 2. For example, 011 (slot 28, FIG. 2) is transmitted and 100 (slot 29, FIG. 2) is received. The received data bits and the check bit for the current slot are each incorrect. The calculated check bit CP for the previous slot is a 1. Since C2 on line 80 is a 0 and CP on line 82 is a 1, different binary values, the output of XOR gate 84 is a 0 and AND gates 90 and 92 are selected. That is, the output of gating network 99 will be the decoded C0' and C1'. Each of the AND gates 100, 102 and 104 has at least one input which is a 0, therefore the output of each of these gates is 0. Accordingly, the output of OR gate 110 is a 0, which is selected by AND gate 90 as the input to OR gate 94. Therefore, the output of gate 94 is a 0. That is C0' is a 0, which is different from the incorrectly received value of C0, but which is the same value as the transmitted C0. Each of the AND gates 104 and 108 has at least one input which is a 0, so the output of each of these gates is 0. However, AND gate 106 has a first input at a 1, C0 on line 76, a second input at a 1, the inverted C1 on line 78, and a third input at a 1, the inverted C2 on line 80. Accordingly, the output of AND gate 106 is a 1. Therefore, the output of OR gate 112 is a 1, which is selected by AND gate 92 as the input to OR gate 96. Therefore, the output of gate 96 is a 1. That is, C1' is a 1, which is different than the incorrectly received value of C1, but which is the same value as the transmitted C1. It is seen that the incorrectly received current slot data bits of 10 (slot 29) have been decoded to yield the transmitted previous slot data bits of 01 (slot 28).. Since C0' is 0 and C1' is 1, the calculated check bit CN at the output of XOR gate 98 is a 1.

Figure 10:
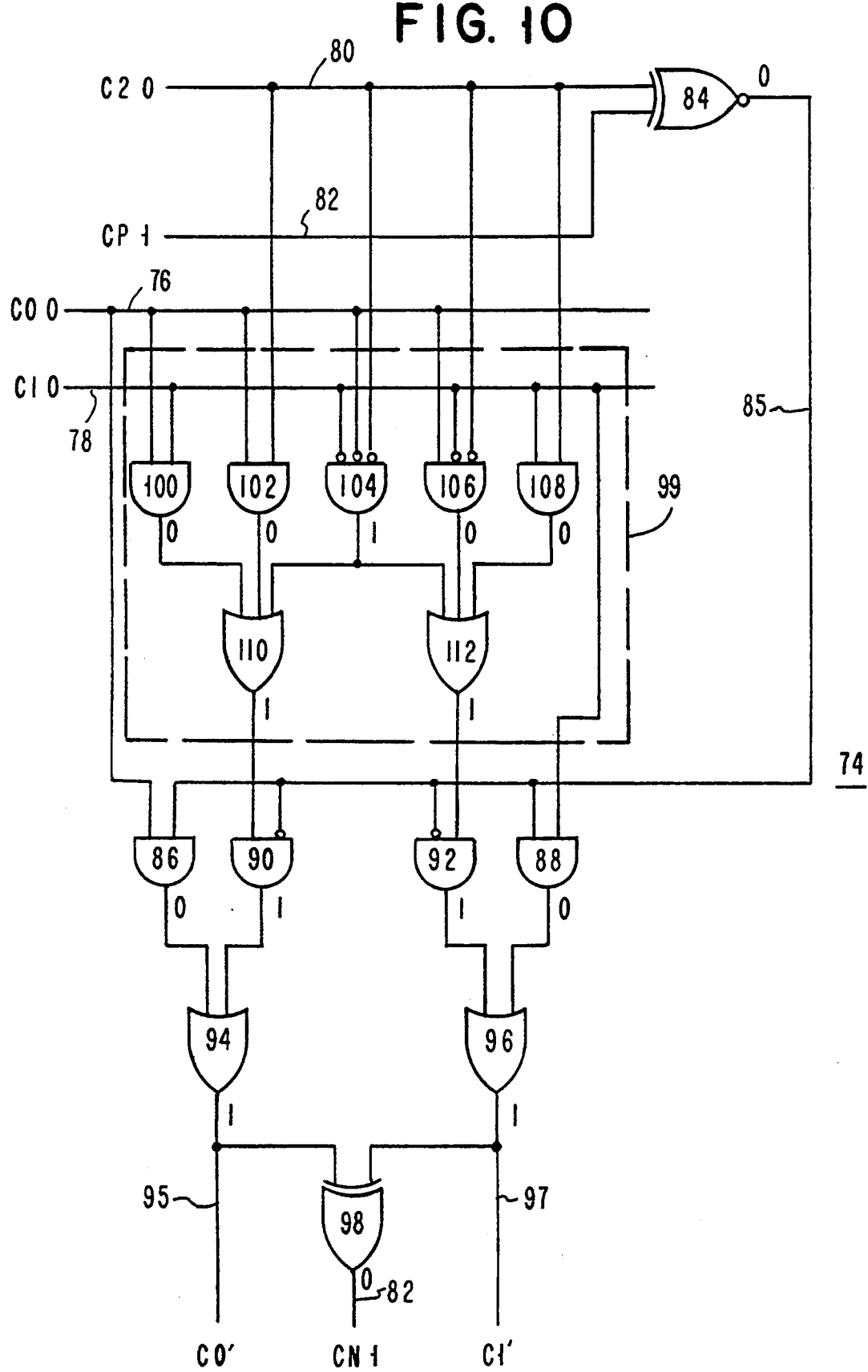

Refer now to FIG. 10 which illustrates another example of a correct decoding by correcting an error in the received data bits and check bit. For example, 111 (slot 36, FIG. 2) is transmitted and 000 (slot 22, FIG. 2) is received. The received data bits and the check bit for the current slot are each incorrect. The calculated check bit CP for the previous slot is a 1. Since C2 on line 80 is a 0 and CP on line 82 is a 1, different binary values, the output of XOR gate 84 is a 0 and AND gates 90 and 92 are selected. That is, the output of gating network 99 will be the decoded C0' and C1'. Each of the AND gates 100 and 102 has at least one input which is a 0, therefore, the output of each of these gates is 0. However, AND gate 104 has a first input at a 1, the inverted C1 on line 78, a second input at a 1, the inverted C0 on line 76 and a third input at a 1, the inverted C2 on line 80. Therefore, the output of AND gate 104 is a 1, which results in the out put of OR gate 110 being a 1, which is selected by AND gate 90 as the input to OR gate 94. Therefore, the output of OR gate 94 is a 1. That is, C0' is a 1, which is different than the incorrectly received value of Co, but which is the same value as the transmitted C0. Each of the AND gates 106 and 108 has at least one input which is a 0, so the output of each of these gates is 0. However, AND gate 104 has an output of 1, as explained above, which results in OR gate 112 having an output of 1, which is selected by AND gate 92 as the input to OR gate 96. Therefore, the output of gate 96 is a 1. That is, C1' is a 1, which is different than the incorrectly received value of C1, but which is the same value as the transmitted C1. It is seen that the incorrectly received data bits 00 (slot 22) have been decoded to yield the transmitted data bits 11 (slot 36). Since C0' is a 1 and C1' is a 1, the calculated check bit is a 0.

INDUSTRIAL APPLICABILITY

It is an object of the invention to provide an improved wireless communication system.

It is another object of the invention to provide an improved wireless infrared communications link utilizing differentially coded and guarded pulse position modulation.

It is still another object of the invention to provide an improved wireless infrared communications link where the data transmission period is divided into a plurality of slots. In a given pair of slots, the first slot comprises a gray code sequence of bits and a parity bit, and the second slot comprises the same gray code sequence of bits and the complement of the parity bit in the first slot. The last slot in a transmission period comprises a guard slot to separate transmission time periods. A decoder receives the encoded data, and for a given slot derives calculated data for the slot from the gray code sequence of bits and the check bit. The check bit of the given slot is compared with a calculated check bit of the previous slot to determine if a predetermined relationship exists. If the predetermined relationship exists, the received encoded data is selected as the output of the decoder, and if the predetermined relationship does not exist, the calculated data is selected as the output of the decoder. The calculated check bit is derived from the output of the decoder for a slot, and is compared with the check bit of the encoded data for the following slot.

Having thus described our invention what we claim as new and desire to secure as Letters Patent, is:

1. A method of pulse position encoding data for transmission over a communications link along which bit errors may be introduced into said pulse position encoded data due to multi-path effects or inaccurate timing, said method avoiding decoding errors caused by said bit errors, said method comprising the steps of:
    dividing a pulse position encoding period into a plurality of slots, a pair of adjacent slots corresponding to each pulse position in said period; and
    encoding pulse position data in each said pair of adjacent slots by inserting a sequence of data bits and a check bit in one of said pair of adjacent slots and inserting said sequence of data bits and the complement of said check bit in the other one of said pair of adjacent slots.

2. The method of claim 1, including the step of:
    utilizing a last slot in said pulse position encoding period as a guard slot to separate pulse position encoding periods.

3. A method of pulse position encoding data for transmission over a wireless communications link along which bit errors may be introduced into said pulse position encoded data due to multi-path effects of inaccurate timing, said method avoiding decoding errors caused by said bit errors, said method comprising the steps of: dividing a pulse position encoding period into M slots, where $M=2^N$, where a pair of adjacent slots of said M slots correspond to each pulse position in said period, where N is the number of bits of data defining a symbol in a slot, and where M and N are integers;
    encoding pulse position data in a given one pair of said adjacent slots by inserting said N bits of data and a check bit in one slot of said given pair, and inserting said N bits of data and the complement of said check bit in the other slot of said given pair.

4. The method of claim 3, including the step of:
    adding an additional slot to said pulse position encoding period, with this additional slot being used as a guard slot to separate pulse position encoding periods.

5. A method of pulse position encoding data for transmission over a wireless communications link along which bit errors may be introduced into said pulse position encoded data due to multi-path effects or inaccurate timing, said method avoid decoding errors caused by said bit errors, said method comprising the steps of:
    dividing a pulse position encoding period into $(2M+1)$ slots, where $M=2^N$ and N is the number of bits of data in each of the slots 1 through 2M, where M and N are integers, and where a pair of adjacent slots of said slots 1 through 2M correspond to each pulse position in said period;
    encoding pulse position data in a predetermined sequence of N bits in the first slot of said pulse position encoding period and a check bit, and with the second slot of said pulse position encoding period having the same predetermined sequence of N bits and the complement of said check bit in said first slot and so on with the (2M+1) slot of said pulse position encoding period having a predetermined sequence of N bits and a check bit, with the 2Mth slot having the same predetermined sequence of said N bits and the complement of the check bit in said (2M+1) slot; and utilizing the (2M+1) slot in said pulse position encoding period as a guard slot to separate pulse position encoding periods.

6. The method of claim 5, including the decoding steps of:

receiving the encoded data;

comparing the check bit of a current slot of the received encoded data with a calculated check bit of a previous slot; and selecting the data from the current slot if the check bit of the current slot and the calculated check bit of the previous slot are the same, and selecting the data from the previous slot if the check bit from the current slot and the calculated check bit of the previous slot are different.

7. A method of decoding received pulse position encoded data which has been transmitted over a wireless communications link along which bit errors might have been introduced into said received pulse position encoded data due to multi-path effects or inaccurate timing, said method avoiding decoding errors caused by said bit errors, where the pulse position encoding period is divided into (2M+1) slots, where $M=2^N$ and N is the number of bits of data in each of the slots 1 through 2M, where M and N are integers, and the received pulse position encoded data is encoded in a sequence of N bits in the first slot of the pulse position encoding period and a check bit, with the second slot of the pulse position encoding period having the same sequence of N bits as the first slot and the complement of the check bit of the first slot, and so on with the (2M−1) slot of the pulse position encoding period having a sequence of N bits and a check bit, with the 2Mth slot having the same sequence of said N bits as the (2M−1) slot and the complement of the check bit, with the (2M+1) slot of the pulse position encoding period being utilized as a guard slot to separate pulse position encoding periods, said method comprising the steps of:

receiving the pulse position encoded data;

comparing the check bit of a current slot with a calculated check bit from a previous slot to determine if they have a predetermined relationship;

selecting the data from the current slot if the check bit of the current slot and the calculated check bit of the previous slot have the predetermined relationship; and selecting the data from the previous slot if the check bit of the current slot and the calculated check bit from the previous slot don't have the predetermined relationship.

8. The method of claim 7, wherein the step of selecting the data from the previous slot includes the step of:

calculating the data of the previous slot based upon the N bits of data and the check bit of the current slot.

9. The method of claim 7, including the step of:

generating a calculated check bit from the selected data, which calculated check bit is utilized as the calculated check bit from the previous slot for the selection of data for the current time slot.

10. In a data communications system where the data transmission period T is divided into (2M+1) slots, where $M=2^N$ and N is the number of data bits in each of the slots 1 through 2M, where M and N are integers, and the data is encoded in a predetermined sequence of N bits in the first slot of said data transmission period and a check bit, with the second slot having the same predetermined sequence of N bits and the complement of said check bit in said first slot, and so on with the (2M−1) slot of said data transmission period having a predetermined sequence of N bits and a check bit, with the 2Mth slot having the same predetermined sequence of said N bits and the complement of said check bit in said (2M−1) slot, with the (2M+1) slot in said data transmission period containing no data so as to act as a guard slot to separate data transmission periods, the combination comprising:

means for transmitting said encoded data;

means for receiving the encoded data;

means for comparing the check bit of a current slot of the received encoded data with a calculated check bit of a previous slot; and means for selecting the data from the current slot if the check bit of the current slot and the calculated check bit of the previous slot are the same, and selecting the data from the previous slot if the check bit from the current slot and the calculated check bit of the previous slot are different.

11. The combination claimed in claim 10, including means for deriving the check bit for a given slot from the N data bits in a slot.

12. The combination claimed in claim 10, including means for deriving the check bit for a given slot in a given data transmission period T from the N data bits in the corresponding slot in the data transmission period immediately preceding said given data transmission period.

13. In a data communication system where the data transmission period is divided into (2M+1) slots, where $M=2^N$ and N is the number of data bits in each of the slots 1 through 2M, where M and N are integers, and the data is encoded in a sequence of N bits in the first slot of the data transmission period and a check bit, with the second slot of the data transmission having the same sequence of N bits as the first slot and the complement of the check bit of the first slot, and so on with the (2M−1) slot of the data transmission period having a sequence of N bits and a check bit, with the 2Mth slot having the same sequence of N bits as the (2M−11) slot and the complement of the check bit, with the (2M+1) slot of the data transmission period being utilized as a guard slot to separate data transmission periods, the combination comprising:

means for receiving the encoded data;

means for comparing the check bit of a current slot of the received encoded data with a calculated check bit of a previous slot to determine if they have a predetermined relationship;

means for selecting the received encoded data for the current slot if the check bit of the current slot and the calculated check bit of the previous slot have the predetermined relationship; and means for selecting the encoded data of the previous slot if the check bit of the current slot and the calculated check bit of the previous slot don't have the predetermined relationship.

14. The combination claimed in claim 13, including: means for generating a calculated check bit from the selected data, which calculated check bit is utilized as the calculated check bit from the previous slot for the selection of data for the current slot.

15. The combination claimed in claim 13, wherein the means for selecting the data from the previous slot, includes means for calculating the data contained in the previous slot based upon the N bits of data and the check bit of the current slot.

16. The combination claimed in claim 15, including means for deriving the check bit for a given slot in a given data transmission period T from the N data bits in the corresponding slot in the data transmission period immediately preceding said given data transmission period.

17. In a data transmission system where the data transmission period is divided into at least a plurality of pairs of slots with each such pair of slots comprising a first slot being encoded with N data bits and a check bit, and the slot immediately following said first slot being encoded with the same N data bits and the complement of the check bit, the combination comprising:
   means for transmitting the encoded data;
   means for receiving the encoded data;
   means for deriving a calculated data from the N data bits and the check bit of the first slot;
   means for comparing the check bit of a given slot of the received encoded data with a calculated check bit of a previous slot to determine if they have a predetermined relationship;
   means for selecting the received encoded data as output data if the check bit of the given slot and the check bit of the previous slot have the predetermined relationship, and selecting the calculated data as output data if the check bit of the given slot and the check bit of the previous slot don't have the predetermined relationship; and
   means for deriving a calculated check bit for a given slot from the output data for the given slot.

18. The combination claimed in claim 17, including a guard slot to separate data transmission periods.

19. The combination claimed in claim 1, including means for deriving the check bit for the first slot in a pair of slots in a given data transmission period from the N data bits in the corresponding slot in the data transmission period immediately preceding said given data transmission period.

20. A method of data communication, where the data transmission period is divided into at least a plurality of pairs of slots, with each such pair of slots comprising a first slot being encoded with N data bits and a check bit, and the slot immediately following said first slot being encoded with the same N data bits and the complement of the check bit, said method comprising the steps of:
   transmitting the encoded data;
   receiving the encoded data;
   deriving a calculated data from the N data bits and the check bit of the first slot;
   comparing the check bit of a given slot of the received encoded data with a calculated check bit of a previous slot to determine if they have a predetermined relationship;
   selecting the received encoded data as output data if the check bit of the given slot and the check bit of the previous slot have the predetermined relationship, and selecting the calculated data as output data if the check bit of the given slot and the check bit of the previous slot don't have the predetermined relationship; and
   deriving a calculated check bit for a given slot from the output data for the given slot.

21. The method of in claim 20, wherein a guard slot is utilized to separate data transmission periods.

22. The method of claim 21, including the step of:
   deriving the check bit for the first slot in a pair of slots in a given data transmission period from the N data bits in the corresponding slot in the data transmission period immediately preceding said given data transmission period. POSITION: FOREMAN ASSISTANT Richard H. Schmehl 110 Ridgefield Road Philadelphia, PA 19154 (215) 632-8463 EDUCATION Northeast High School Philadelphia, PA Graduated in June 1976 Carpenters Apprenticeship School 10401 Decatur Road Philadelphia, PA March 1977 to May 1981 Graduated in May 1981 WORK HISTORY September 1994 to Present Sparks Exhibits 2828 Charter Road Phila., PA (215) 676-1100 Position: Client Service Manager Responsibilities include overseeing all shipping and receiving, and warehouse duties, scheduling of installations and take-downs of exhibits, oversee all inspections and repairs of exhibits, and scheduling of client previews. March 1977 to September 1994 Parisi, Inc. 3031 Red Lion Road Phila., PA (215) 632-4495 Position: Cabinetmaker and Installer Experienced in all phases of woodworking, laminating and machinery. Supervised crew during outside installations. REFERENCES supplied upon request

* * * * *